United States Patent Office 2,763,554
Patented Sept. 18, 1956

2,763,554

ART OF STABILIZING CARBONATED MALT BEVERAGE

Mortimer W. Brenner, Hartsdale, N. Y., assignor to Schwarz Laboratories, Inc., a corporation of New York No Drawing. Application January 17, 1955, Serial No. 482,419

11 Claims. (Cl. 99—48)

The present invention is concerned with the elimination of gushing or overfoaming of malt beverage, more especially of fermented malt beverage such as beer and ale, upon opening the sealed consumer package.

As conducive to a clear understanding of the invention, it is noted that the brewing industry has been plagued for decades with the problem of overfoaming, commonly known as "gushing" of malt beverages, more especially of beer and ale. Gushing occurs when the consumer package (bottle or can) is opened, even though it has been properly cooled, and not subjected to agitation immediately before opening. Such gushing involves the loss of a substantial fraction of the liquid with an inordinate amount of foam evolved. This evil of gushing beer will strike unexpectedly the product of some one particular brewer, while competing brewers may remain untroubled. The loss to the afflicted brewer is frequently irreparable and can well be ruinous.

The difficulty has sometimes been ascribed to the use of a particular lot of malt delivered to the brewer by one maltster, where competing brewers who obtain their malt from other sources are not afflicted with this trouble. As a consequence, serious and sometimes ruinous losses are suffered by the maltster or maltsters to whose product the gushing phenomenon has been ascribed.

Many authorities in the brewing industry appear to agree that the rapid evolution of gas, known as "gushing," on opening the bottle or can, results from the presence of nuclei in the brew which in some way causes the rapid release of carbon dioxide gas. But whether any and all solids formed in the beer or any particular solid is accountable for gushing has not been found in previous investigations, much less has any effective cure been suggested to eliminate such troublesome nuclei and the resultant gushing difficulty.

Considerable literature on this difficulty has been published over the last few decades which attempts to explain the causes of the ailment. Among the various explanations for gushing found in the literature are the following: (a) high carbon dioxide content; (b) excessively long interval between pasteurization and opening of the container, alleged to result in progressive precipitation in the package of substances present in the beverage; (c) change in the beverage colloids as by denaturing in pasteurization; (d) pepsin added to the beverage to obtain protein stability; (e) presence of a critical amount of formol nitrogen in the beverage; (f) presence of small amounts of soluble iron salt in the beverage; (g) excessive shaking, jostling or bumping of the liquid in transportation within the shipping containers; (h) variations in the crop of barley used in preparing the malt; (i) rise of temperature before or during carbonation; (j) denaturing of the protein content by excessive chilling; (k) presence of dirt or dried alkali in badly washed bottles; (l) filling into bottles or containers that are too warm; (m) storage at temperatures excessively high or excessively low; (n) presence of nitrites formed by yeast in a medium deficient in nutrients; and (o) use of malt with high proteolytic activity.

Oxalic acid or soluble oxalate salts are normal constituents of many plant materials including hops and barley, and therefore of the malt produced from the barley for incorporation in malt beverages. It is the malt and hops that are the chief source of oxalic acid present in beer, ale and other malt beverages. Since malt contains significant amounts of calcium, some calcium oxalate will ordinarily form in any wort even though the water used for brewing be not hard. Though some precipitate containing calcium oxalate may be found in the scale on the heating surfaces of brewers' kettles used in processing the wort, substantial amounts of calcium oxalate remain in solution in the wort, indeed to the extent of 50 to 75 p. p. m.

Upon fermentation following the addition of yeast to the finished wort, cooled to 40 to 70° F., the solubility of calcium oxalate decreases and may reach about 20 to 30 p. p. m. in fermented beer or ale. As a consequence of the lower solubility, the excess calcium oxalate separates out of solution during fermentation, some crystals settling to the bottom of the fermenter vessel and some depositing on the walls and interior of the fermenter, generally mixed with yeast, protein and other substances. Such deposit is known as "beer stone."

In storage or ageing of fermented beer, generally at 29 to 39° F. for from one to eight weeks, some further decrease of calcium oxalate solubility occurs, chiefly due to temperature decrease, with further beer stone formation in the storage or ageing tank.

While the precipitation of calcium oxalate under proper brewing conditions is thus substantial, as above set forth, beer or ale of normal pH and carbonation may lack sufficient calcium for substantially complete precipitation of calcium oxalate during fermentation and storage. The unprecipitated calcium oxalate may be even greater if conditions are unfavorable to precipitation, such as for instance if the storage temperature is not sufficiently low or the storage period is too short to permit the amount of precipitation that would otherwise occur.

Precipitation of calcium oxalate during brewing may occur in a number of different crystal forms and also in microcrystalline or non-crystalline, amorphous, granular, sandy or protein-like form. It is this latter protein-like form of minutely subdivided precipitate that, as first discovered by this applicant, is mainly responsible for the gushing phenomenon in carbonated malt beverage. This amorphous precipitate of the oxalate salt may be found at any and all stages in the ordinary brewing operation, depending on the nature of the colloids, the solute and the absolute amount of calcium and oxalate ions in solution.

The presence of as little as one part per million of soluble iron salt also promotes the separation of insoluable matter, with changes in the colloidal balance and disturbance of the solubility equilibrium of calcium oxalate, promoting precipitation of significant amounts of microcrystalline or amorphous oxalate of calcium that is chiefly responsible for the phenomenon of gushing as herein first disclosed by this applicant.

If beer or ale that contains oxalate ions as set forth, is brought in contact with any material containing soluble calcium salts, calcium oxalate may precipitate out as evidenced by turbidity in the bottle or draft beer. This may occur when (a) brew with excess of calcium is blended with brew having free oxalic acid, or (b) brew with free oxalic acid passes through freshly packed filtermass filter that has been washed in hard water, leading to deposition of calcium carbonate on the filtermass fibers, when the water is heated to normal washing temperature. Such calcium carbonate is soluble in carbonated beer and may later give rise to what is known as oxalate turbidity or crystal haze.

The brewers' practice of adding calcium salts in the course of processing malt beverages is generally for the following purposes:

1. To control the pH of the wort in normal brewing process by the customary addition of water hardening salts, chiefly calcium sulphate, which incidentally causes some oxalate precipitation to occur.

2. Even where soluble calcium salt is added under carefully prescribed conditions to overcome oxalate turbidity by precipitation of calcium oxalate crystals, there is still left in solution sufficient oxalate and calcium ion to cause gushing, especially if the packaged brew is subjected to conditions of chilling, and jostling or jolting of the packages to promote the formation of amorphous calcium oxalate precipitated therein.

The addition of calcium in the brewers' art bears no controlled relationship to the problem of eliminating the formation of microcrystalline or amorphous calcium oxalate responsible for gushing in the bottled or cannel product. For, it is frequently wholly insufficient and under conditions of processing improper to assure the necessary control of the metastable equilibrium of calcium and oxalate ions in the finished beer and ale. It has been experimentally demonstrated by this applicant that the addition of even slightly soluble calcium salts or soluble oxalate salts to carbonated beverage in the consumer package will cause the same to exhibit overfoaming or gushing after several hours of storage under conditions of chilling, especially under vibration that promotes precipitation of amorphous calcium oxalate.

The present invention is predicated upon this applicant's discovery, after extensive research, that the phenomenon of gushing is chiefly due to the presence or formation in the packaged brew of significant amount of calcium oxalate in microcrystalline or amorphous, sandy or protein-like form, which presents a relatively tremendous surface area to serve as effective nuclei for quick release of carbon dioxide gas upon opening the bottle or can in which the beverage is sealed. Such amorphous precipitate may remain suspended in the brew and some is frequently present in the proteinaceous sediment commonly found in packaged beer, though it may not be in an amount sufficient to provide enough nuclei for distinct gushing activity under ordinary conditions of handling of the packaged malt beverage.

It is among the objects of the invention to provide a malt beverage including fermented malt beverages such as beer and ale, in which the difficulty of gushing upon opening the bottle or can containing the brew is effectively avoided, substantially regardless of the conditions with respect to temperature and vibration, jostling or agitation to which the packaged beverage is subjected at or immediately before opening.

Another object is to provide a process for carrying on the treatment of the oxalate-containing ingredients of beverages, including particularly malt and hops, or a process for conducting the brewing operation in such manner as effectively to eliminate the presence of significant amounts of microcrystalline or amorphous calcium oxalate precipitate in the packaged beverage and thereby to eliminate the chief if not sole cause of gushing, which as the applicant has discovered, is substantially ascribable to the presence of such microscopic precipitate of insoluble oxalate salt in the liquid.

Another object is to effect the elimination of gushing without modification in the standard brewing equipment and with resort to inexpensive, non-toxic substances to be added at some step in the brewing operation or the preparation of one or more ingredients of the mash.

According to the invention from its most general aspect, the soluble oxalate or oxalic acid present in the malt and in the hops is precluded from forming insoluble microcrystalline or amorphous precipitate in the packaged beverage by adding an excess of non-toxic soluble salt of zinc or bismuth, but preferably of calcium because of its low cost, in amounts sufficient to promote formation of crystals of metallic oxalate and thus to fix the oxalate in an insoluble form, either directly in or on brewing components such as the malt and the hops, or to effect this precipitation in one of the sequence of vessels between the mash tub and the cold storage tank, in order to cause the desired precipitate of the insoluble oxalate from the wort or the beverage in one of the processing vessels, in each case to such extent that the chance of thereafter developing the critical microcrystalline or amorphous oxalate nuclei in the packaged beverage is virtually absent.

The precipitate of the insoluble metal oxalate, whether effected on or in the malt or hops or in one of the vessels in which the brewing operation proceeds, is effectively removed from the beverage prior to the packaging operation, in part by settling to the bottom of the vessel or vessels in which the oxalate is precipitated as the brewing proceeds and in part by the conventional filtering operation between the fermenting and the storing vessel and the further filtering operation between the cold storage tank and the packaging plant.

In order to assure that the amount of oxalate ion that remains in the brew after filtration is so slight as not to lead to the formation of oxalate nuclei in the packaged beverage, it is important according to another feature of the invention that the beverage prior to its last filtration preparatory to packaging, shall have a considerable preponderance of metal ion over the oxalate ion, this preponderance being preferably of 10 to 12 or more molar equivalents of calcium, zinc or bismuth to one molar equivalent of oxalate. It is this preponderance of calcium (or of zinc or bismuth where used) that effects a sufficient mass action to precipitate out as metal oxalate in the tank preparatory to the final filtration, all of the oxalate, except such very slight amount as has been found in practice to be negligible, inasmuch as it will not produce the microcrystalline or amorphous insoluble oxalate crystals in the packaged beverage even under extremes of low storing temperature and jostling or vibration of the packages.

According to the invention, the soluble calcium salts are to be preferred for economic reasons, as the agency to compel precipitation of the oxalate and eliminate what this applicant has ascertained to be the cause for gushing of malt beverages. Such calcium salt may be the sulphate, the chloride, the acetate, the bicarbonate, the citrate, the gluconate or the lactate as the most familiar examples, although other non-toxic, soluble calcium salts might be used.

The complete efficacy of the process above set forth may be checked and assured with desired factor of safety by subjecting the consumer packaged beverage to shock chilling greater than what might be expected in commercial practice, and at the same time subjecting it to mechanical vibration for a period of several days, followed by vigorously shaking the beverage for a few seconds and opening it after an ensuing period of rest in the order of a minute or less. If the beverage should gush under this severe test, the addition of soluble calcium salt in one of the vessels in the brewing sequence will assure the precipitation of excess oxalate in the finished brew so that the beverage thus adjusted will be free of any gushing tendency.

Within any one manufacturing operation, it would be possible to derive a correlation between the absence of gushing tendency in the test described above with analytically determined levels of calcium and oxalate ions in the consumer packaged beverage, as a basis for control of gushing.

While the foregoing specification is believed fully to set forth the invention, a few specific examples follow in order to assure compliance with statutory requirements.

Example 1

In the steeping of barley to produce the green malt, the final water change may be treated with soluble metal salt to produce the desired precipitation of the insoluble metal oxalate. Illustratively one pound of calcium acetate may be dissolved per 100 pounds of the final treating water change in the steeping operation. When the steeped barley is transferred to the germinating area, the calcium acetate solution which is separated from the barley may be retained for re-use.

Example 2

Instead of sprinkling the green malt with plain water as usual, it is sprinkled with a solution of calcium salt, illustratively calcium chloride in water, of concentration adjusted to the added water required to maintain the desired water content of the green malt. Preferably 400 mgs. of calcium chloride is used for each kilogram of green malt, which ordinarily would contain about 450 mgs. of oxalic acid. Thus the desired precipitation of insoluble calcium oxalate occurs at this stage.

Example 3

As the dried malt is discharged from the malt kiln with a moisture content ordinarily of 3.5 per cent, the malt is sprayed with a solution of calcium salt, illustratively ½ per cent calcium citrate in water, to bring the water content to approximately 4 per cent, and thereby the desired precipitation of calcium oxalate occurs.

Example 4

Soak the hops used for dry hopping of ale for thirty minutes to one hour in a water solution of soluble calcium salt. Desirably gypsum is used in saturated solution together with one pound of calcium bisulfite at about 120° F., and thus the desired precipitation of calcium oxalate is effected. The excess solution is then separated from the treated hops.

Example 5

During the boiling of the wort in the kettle, add soluble calcium salt, illustratively 10 pounds of gypsum per hundred barrels of wort, to effect the desired precipitation of calcium oxalate, which gypsum is in addition to the significant amount of calcium ions introduced with the brewing materials in the mash.

Example 6

As wort is transferred to the fermenter, it is treated with calcium salt, desirably with a mixture of calcium citrate, calcium gluconate, calcium lactate and calcium chloride, which may be a mix of 15 pounds per 100 barrels of beer or wort. While considerable separation of calcium oxalate normally occurs in the fermenting vessel, even in the absence of such added calcium salt, the treatment set forth is effective to cause substantially all of the remaining oxalate to be precipitated as calcium oxalate.

Example 7

Should filtered or storage beer that has not been adequtely subjected to treatment or to treatment of a component thereof, according to procedure such as that of one of the Examples 1 to 6, be found upon test to have an oxalate ion content which is so high, say 20 p. p. m. as to lead to gushing, it should be treated with 4 to 8 pounds of calcium salt, desirably a mixture of gypsum, calcium chloride and calcium acetate per hundred barrels of beverage. Preferably there is included in the added calcium salt 1 to 2 per cent by weight of fine crystalline particles of calcium oxalate. These added crystals serve as nuclei for crystal growth and aid the mass action effect of the soluble calcium toward precipitation and separation of oxalate in insoluble form before packaging. Desirably, a suitable vibrator is applied to or in the tank to agitate the beverage and thus accelerate the precipitation of calcium oxalate. So much of that precipitate as does not settle out as "beer stone" is then removed from the beverage in the filtering operation.

Example 8

If despite resort to the common brewers' practice of treating the brewing water added to the mash tub with about 10 pounds of gypsum for each hundred barrels of finished beer, analysis shows, as frequently is the case, that the metastable calcium oxalate in the finished beer is in the order of as little as 20 parts per million, the brew may have a tendency to gush upon opening the bottle or can. The difficulty can be obviated by introduction into the mash tub of an additional 5 to 7 pounds of soluble calcium salt per 100 barrels of the brewing water. By this simple treatment, the oxalate content of the finished beverage may be so reduced that the tendency of gushing would be overcome.

While in each of the illustrative examples and in numerous variations apparent to the brewer from the foregoing disclosures, the addition of soluble calcium salt or the like would be required at only one of the stages in the treatment of malt and hops or the treatment in any one of the sequence of vessels in which the brewing operation proceeds from the mash to the storage tank, it is of course possible within the scope of the invention to add at more than one of these stages, the soluble calcium, zinc or bismuth salt in amounts aggregating that necessary to effect the desired precipitation.

It will thus be seen that the present invention affords a simple procedure which requires but inexpensive, non-toxic materials readily applied in the standard brewing procedure without adding materially to the cost or complexity of the operation, by which the serious evil of gushing of malt beverages is effectively controlled, checked or eliminated.

As many changes could be made in the above process and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. The method of substantially precluding gushing upon opening the sealed consumer container of packaged carbonated malt beverage, by adding at at least one stage of the processing of at least one component thereof, prior to consumer packaging of the beverage, a preponderance of soluble calcium salt selected from the acetate, bicarbonate, sulfate, bisulfite, chloride, citrate, gluconate, and lactate, sufficient to attain, after the resultant precipitation of calcium oxalate a molar ratio of calcium ion to oxalate ion of the order of 10 to 1, thereby to precipitate nearly all of the oxalate as the calcium salt thereof, which precipitate is removed in the conventional filtration prior to packaging, whereby only a substantially negligible residue of oxalate ion remains in solution in the packaged beverage, inadequate to form nuclei by precipitation with calcium.

2. The method as claimed in claim 1, by adding the soluble calcium salt in the course of processing the grain in preparing the malt component of the beverage.

3. The method as claimed in claim 1 by adding the soluble calcium salt in the water solution used in soaking the hop component of the beverage.

4. The process recited in claim 2 in which approximately 400 mgms. of calcium chloride are added for each kilogram of green malt by sprinkling green malt with calcium chloride solution of corresponding concentration in adjustment of the water requirements during germination of the barley.

5. The method as claimed in claim 2 by adding the soluble calcium salt in proportion of approximately one pound per 100 pounds of water in the final water change during the steeping of the barley used in preparing the malt component of the beverage.

6. The method as claimed in claim 2, by spraying the non-toxic soluble calcium salt in solution upon the dried malt component of the beverage prior to incorporation in the mash, to raise the moisture content of the dried malt by approximately one-half of 1 per cent.

7. The method as claimed in claim 1, which comprises precipitating much of the oxalate ion introduced into the mash tub with the malt ingredient at the infusion stage by adding the soluble calcium salt into one of the sequence of vessels used in the brewing operation, beginning with the mash tub and ending with the cold storage vessel.

8. The method as claimed in claim 7 by adding the soluble calcium salt to the wort in the brewing kettle.

9. The method recited in claim 1 in which the added calcium salt consists of a mixture of gypsum, calcium chloride and calcium acetate in amount of 4 to 8 pounds per hundred barrels of beverage, and in which the mixture includes 1 to 2 per cent of fine crystalline particles of added calcium oxalate to serve as nuclei for precipitation of calcium oxalate and to aid the mass action effect of the soluble calcium toward precipitation, and further promoting the precipitation by mechanically vibrating the beverage in the tank.

10. The method as claimed in claim 7 by adding the soluble calcium salt during the transfer of the wort to the fermenter.

11. The method as claimed in claim 1 in which the soluble calcium salt is added to the filtered or storage beverage prior to packaging and in which the resultant oxalate precipitate is filtered out prior to packaging.

References Cited in the file of this patent

UNITED STATES PATENTS

| | | |
|---|---|---|
| 2,117,604 | Fessler et al. | May 17, 1938 |
| 2,320,486 | Stuart | June 1, 1943 |
| 2,475,368 | Bauer et al. | July 5, 1949 |
| 2,548,594 | Edmonds | Apr. 10, 1951 |